United States Patent
Kwun et al.

(10) Patent No.: US 7,839,827 B2
(45) Date of Patent: Nov. 23, 2010

(54) METHOD FOR DETERMINING HANDOFF IN A MOBILE COMMUNICATION SYSTEM, AND SYSTEM SUPPORTING THE SAME

(75) Inventors: Jong-Hyung Kwun, Seoul (KR); Sung-Hyun Cho, Suwon-si (KR); Ki-Ho Kim, Seoul (KR); Jung-Hoon Cheon, Suwon-si (KR); Ok-Seon Lee, Suwon-si (KR); Chi-Hyun Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1184 days.

(21) Appl. No.: 11/475,611

(22) Filed: Jun. 27, 2006

(65) Prior Publication Data
US 2007/0015511 A1    Jan. 18, 2007

(30) Foreign Application Priority Data
Jun. 27, 2005   (KR) .................. 10-2005-0055949

(51) Int. Cl.
*H04Q 7/36* (2006.01)
*H04Q 7/38* (2006.01)
*H04W 72/00* (2009.01)

(52) U.S. Cl. .................. 370/332; 370/331; 455/436
(58) Field of Classification Search .................. None
See application file for complete search history.

(56) References Cited

U.S. PATENT DOCUMENTS

| 6,321,089 B1 * | 11/2001 | Han ................ 455/438 |
|---|---|---|
| 6,434,386 B1 * | 8/2002 | Lundborg .............. 455/436 |
| 6,438,377 B1 * | 8/2002 | Savolainen ............ 455/439 |
| 7,206,580 B2 * | 4/2007 | Black .................... 455/437 |
| 7,403,503 B2 * | 7/2008 | Cuffaro et al. ......... 370/329 |
| 7,477,625 B2 * | 1/2009 | Kang .................... 370/331 |
| 2002/0045451 A1 * | 4/2002 | Hwang et al. ......... 455/442 |
| 2003/0032431 A1 * | 2/2003 | Chang .................. 455/438 |
| 2004/0002334 A1 * | 1/2004 | Lee et al. ............. 455/436 |
| 2005/0013276 A1 * | 1/2005 | Ekl et al. .............. 370/332 |

FOREIGN PATENT DOCUMENTS

| EP | 1 081 876 | 3/2001 |
|---|---|---|
| EP | 0 956 726 | 9/2005 |
| WO | WO 97/31487 | 8/1997 |
| WO | WO 2005/015922 | 2/2005 |

OTHER PUBLICATIONS

Next-Generation Mobile Communication Practice Technique, Jinhan Books, 2001.

* cited by examiner

*Primary Examiner*—Rafael Pérez-Gutiérrez
*Assistant Examiner*—Frank Donado
(74) *Attorney, Agent, or Firm*—The Farrell Law Firm, LLP

(57) ABSTRACT

A method for determining a handoff of a mobile station (MS) in a mobile communication system. In the method, a serving base station (BS) measures a level of a first uplink signal by monitoring an uplink to the MS. The serving BS receives a level of a second uplink signal, measured and reported by at least one neighbor BS. The serving BS determines a handoff for the MS considering the level of the first uplink signal and the level of the second uplink signal.

11 Claims, 10 Drawing Sheets

METHOD FOR DETERMINING HANDOFF IN A MOBILE COMMUNICATION SYSTEM, AND SYSTEM SUPPORTING THE SAME

PRIORITY

This application claims the benefit under 35 U.S.C. §119 (a) of an application entitled "Method for Determining Handoff in a Mobile Communication System, and System Supporting the Same" filed in the Korean Intellectual Property Office on Jun. 27, 2005 and assigned Ser. No. 2005-55949, the contents of which are incorporated herein by reference.

BACKGROUND OF THE INVENTION

1. Field of the Invention

The present invention relates generally to a handoff method in a cellular mobile communication system and a system supporting the same, and in particular, to a method and system for determining handoff, considering a level of an uplink signal.

2. Description of the Related Art

In general, due to the ease of portability of a mobile station (MS) and the frequency with which MS users travel, MSs tend to regularly move between service coverage areas. In this case, a mobile communication system supports handoff in order to seamlessly provide voice or data service. The handoff takes more than only the positional movement of the MS into consideration. For example, a variation in the communication environment and the increasing number of MSs located in the service coverage can also be considered.

The handoff refers to a procedure for efficiently detecting the variation in the communication environment and setting up a new communication path to the optimum base station (BS). That is, the handoff involves forming a communication path to a neighbor BS, if the neighbor BS has a communication environment superior to that of a serving BS. The serving BS refers to a BS from which the MS is receiving a service, and the neighbor BS refers to a BS to which the MS located in the serving BS can easily move. A target BS indicates a neighbor BS to which the MS desires to move.

FIG. 1 illustrates a configuration of a general cellular mobile communication system, wherein each cell is equivalent to a service coverage area.

Referring to FIG. 1, a first MS 112 to a third MS 116 are located in a first service coverage area formed by a first BS 110. Of the MSs, the third MS 116 is located in the region (handoff region) where there is a need for handoff from the first BS 110 to a second BS 120. The first BS 110 is a serving BS of the third MS 116, and the second BS 120 is a target BS of the third MS 116.

Commonly, a handoff method can be classified as follows.

First, the handoff method can be a Break-Before-Make (BBM) handoff scheme or a Make-Before-Break (MBB) handoff scheme according to a disconnect time with the serving BS. The BBM handoff scheme sets up a connection to the target BS after releasing a connection to the serving BS in response to a handoff request. The MBB handoff scheme holds the connection to the serving BS until it sets up a connection to the target BS. The MBB handoff scheme can prevent a ping-pong effect due to the handoff, and obtain spatial diversity gain. The MS releases the connection to the serving BS after it completely leaves the handoff region.

Second, the handoff method can be an MS-initiated handoff scheme, a network-initiated handoff scheme or an MS-assisted handoff scheme according to the subject of performing the handoff. That is, the handoff method can be classified according to the subject of detecting an occurrence of the handoff and determining the target BS.

Finally, the handoff method can be classified into an MS-initialized handoff scheme or a BS-initialized handoff scheme according to a method of initializing measurement of the communication environment for determining whether to perform a handoff.

FIG. 2 illustrates operations of MS-initialized and MS-assisted handoff schemes, which are examples of the aforementioned handoff schemes.

Referring to FIG. 2, an MS connected to a serving BS (serving cell or serving sector) periodically monitors the wireless channel environment for a downlink to a neighbor BS (neighbor cell or neighbor sector) in steps 210, 212 and 214. The MS measures strengths of the signals received from neighbor BSs through the monitoring. Commonly, a pilot signal is used for the monitoring. If the measured signal strength is greater than or equal to a threshold, the MS sends a handoff request to the serving BS. The MS reports an identifier of the signal-measured neighbor BS and the measured signal strength to the serving BS.

The serving BS determines whether to perform handoff depending on the signal strength reported from the MS. The serving BS reports the determination to an upper layer, and sends a handoff command to the MS.

The handoff scheme based on the wireless channel environment of the downlink is used for handoff between BSs using the same frequency band. That is, this handoff scheme is mainly applied to the mobile communication system that acquires code synchronization using searchers and fingers. This is because the MS can measure strength of a signal received from a neighbor BS using a searcher in an idle state even while in data communication with the serving BS. Therefore, there is no need to set up an additional device or a separate search interval. The search interval is used for measuring strength of a signal received from a neighbor BS.

However, in the Broadband Wireless Access (BWA) system in which neighbor BSs use different frequencies or multiple carriers, the search interval should be separately set up. The search interval is set up in the interval where data exchange with the serving BS is not performed. The MS performs an operation of searching for the wireless channel environment of a signal and a downlink, and periodically reports the search result through uplink resource allocation for the serving BS.

As described above, the separate search interval should be set up to apply the existing handoff scheme to the BWA system. In addition, the MS should be allocated the uplink resource used for reporting the search result.

SUMMARY OF THE INVENTION

Therefore, the present invention provides a method and system for performing handoff based on the uplink channel environment in a BWA system.

The present invention also provides a handoff method and system for reducing calculation required in an MS in association with handoff in a multi-carrier BWA system.

The present invention further provides a method and system for performing handoff based on the uplink channel environment in a serving BS (or serving sector) and the uplink channel environment in a neighbor BS (or neighbor sector).

The present invention further provides a method and system for optionally considering the downlink channel environment in performing handoff based on uplink channel environment.

According to the present invention, there is provided a method for determining handoff of an MS in a mobile communication system. The method includes measuring, by a serving BS, a level of a first uplink signal through monitoring on an uplink to the MS, receiving, by the serving BS, a level of a second uplink signal, measured and reported by at least one neighbor BS, and determining, by the serving BS, handoff for the MS considering the level of the first uplink signal and the level of the second uplink signal.

The serving BS determines handoff for the MS by additionally considering a level of a downlink signal reported from the MS.

The serving BS sends a request for transmission of a signal through a frequency band unused in an uplink to the MS, and determines handoff for the MS by additionally considering a level of an uplink signal received in response to the request.

According to the present invention, there is provided a method for determining handoff of an MS in a mobile communication system, including measuring, by a neighbor BS, a level of a first uplink signal through monitoring on an uplink to the MS, receiving, by the neighbor BS, a level of a second uplink signal, measured and reported by a serving BS, and determining, by the neighbor BS, handoff for the MS considering the level of the first uplink signal and the level of the second uplink signal.

The neighbor BS determines handoff for the MS via the serving BS by additionally considering a level of a downlink signal reported from the MS.

The neighbor BS sends a request for transmission of a signal through a frequency band unused in an uplink to the MS, and determines handoff of the MS by additionally considering a level of an uplink signal received in response to the request.

According to the present invention, there is provided a mobile communication system including an MS, a serving BS for measuring a level of a first uplink signal through monitoring on an uplink to the MS, receiving a level of a second uplink signal reported from at least one neighbor BS, and determining handoff for the MS considering the level of the first uplink signal and the level of the second uplink signal, and at least one neighbor BS for measuring the level of the second uplink signal through monitoring on the uplink to the MS at a request of the serving BS, and reporting the measured level of the second uplink signal to the serving BS.

According to the present invention, there is provided a mobile communication system including an MS, at least one neighbor BS for measuring a level of a first uplink signal through monitoring on an uplink to the MS, receiving a level of a second uplink signal reported from at a serving BS, and determining handoff for the MS considering the level of the first uplink signal and the level of the second uplink signal, and the serving BS for measuring the level of the second uplink signal through monitoring on the uplink to the MS at a request of the neighbor BS, and reporting the measured level of the second uplink signal to the at least one neighbor BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Figure 1:
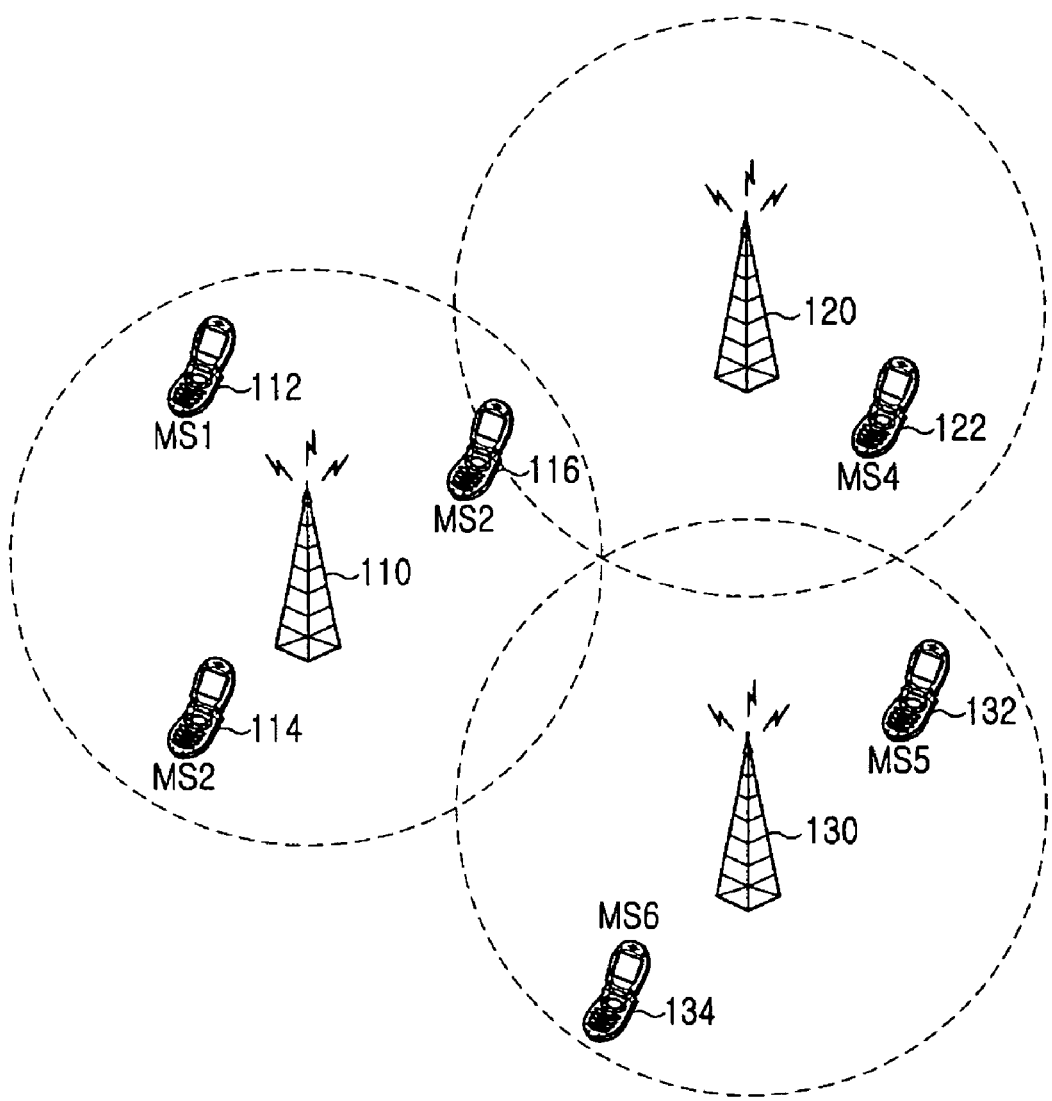
FIG. 1 illustrates a configuration of a conventional cellular mobile communication system, wherein each cell is equivalent to service coverage.
Figure 2:
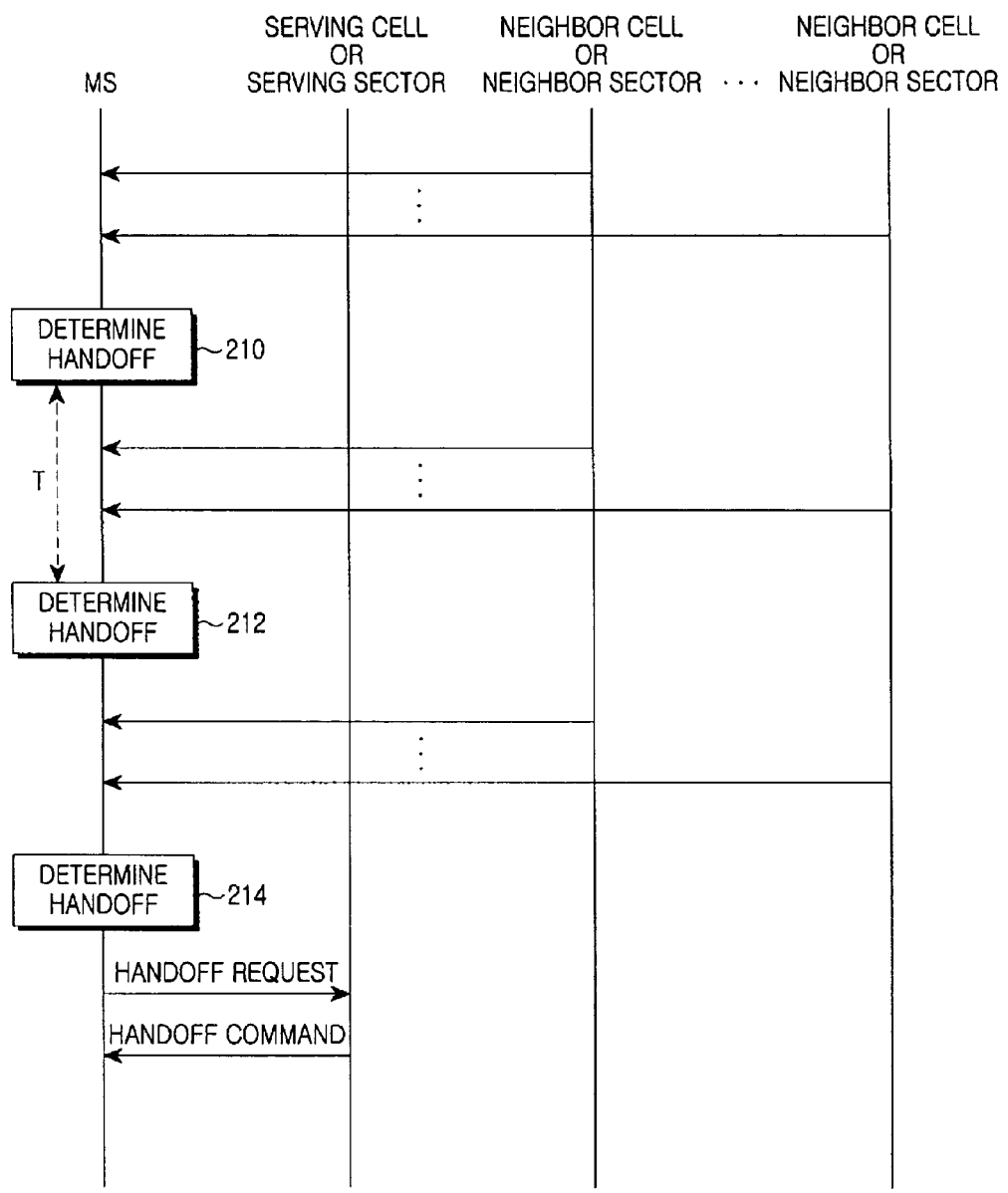
FIG. 2 illustrates operations of MS-initialized and MS-assisted handoff schemes.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail for the sake of clarity and conciseness.

In the following description, the present invention proposes a handoff method for determining the occurrence of a handoff and an appropriate target BS (or target sector) based on an uplink signal level (uplink channel environment) between an MS and a serving BS (or serving sector), and between the MS and neighbor BSs (or neighbor sectors) in order to guarantee mobility of the MS in a cellular mobile communication system.

In order to prevent an incorrect handoff operation, if a level of an uplink signal is less than or equal to a threshold, the present invention allows the serving BS to determine whether to perform handoff by additionally considering at least one of an uplink signal level of a frequency band currently unused by the MS or the full frequency band and a downlink signal level of the serving BS. To this end, the present invention allows the serving BS to send a request for transmission of a possible signal pattern for signal level search to the MS, or allows the MS to report a level of the downlink signal.

The handoff method is divided into various scenarios according to the handoff initialization subject, the parameters used for determining an occurrence of a handoff, and the subject of determining the occurrence of the handoff. The present invention provides two preferred embodiments. In the first embodiment, the serving BS determines whether to perform a handoff, and in the second embodiment, the target BS determines whether to perform a handoff.

Therefore, a description will first be made of a first embodiment in which the serving BS determines whether to perform a handoff. Next, a description will be made of a second embodiment in which the target BS determines whether to perform a handoff. Although only the inter-cell handoff will be considered in the following description, the inter-sector handoff can also be applied to the present invention. That is, in the following description, the serving BS, neighbor BS and target BS can be replaced with the serving sector, neighbor sector and target sector, respectively.

A. First Embodiment

The first embodiment of the present invention proposes a handoff scheme in which a serving BS initializes a handoff process, and determines whether to perform the handoff with assistance of a neighbor BS. To this end, the serving BS detects the channel environment of an uplink and determines whether to perform handoff of a corresponding MS using the detected channel environment. In determining whether to perform handoff of the corresponding MS, the serving BS can additionally consider the uplink channel environment of at least one neighbor BS. In addition, if the channel environment of the uplink is lower than expected, the serving BS considers not only the uplink channel environment of a frequency band unused by the corresponding MS, but also the downlink channel environment reported from the MS.

In the first embodiment of the present invention, a description will be made of an operation in which a serving BS and a neighbor BS perform handoff considering a level of an uplink signal. Additional description will be made of a scenario where an uplink channel of a frequency band unused by a corresponding MS is taken into consideration, and another scenario where the downlink channel environment reported from the MS is considered.

A-1. Handoff Performed Considering Only Uplink Channel of Frequency Band in Use A serving BS measures strength of an uplink signal for each of its MSs, and calculates a level of the uplink signal depending on the measured uplink signal strength. The serving BS performs a handoff initialization process by determining whether to perform handoff for each of the MSs depending on the calculated uplink signal level. The handoff initialization process includes a procedure for determining a target BS associated with each MS, and sending a handoff command to the target BS and the MS.

Figure 3:
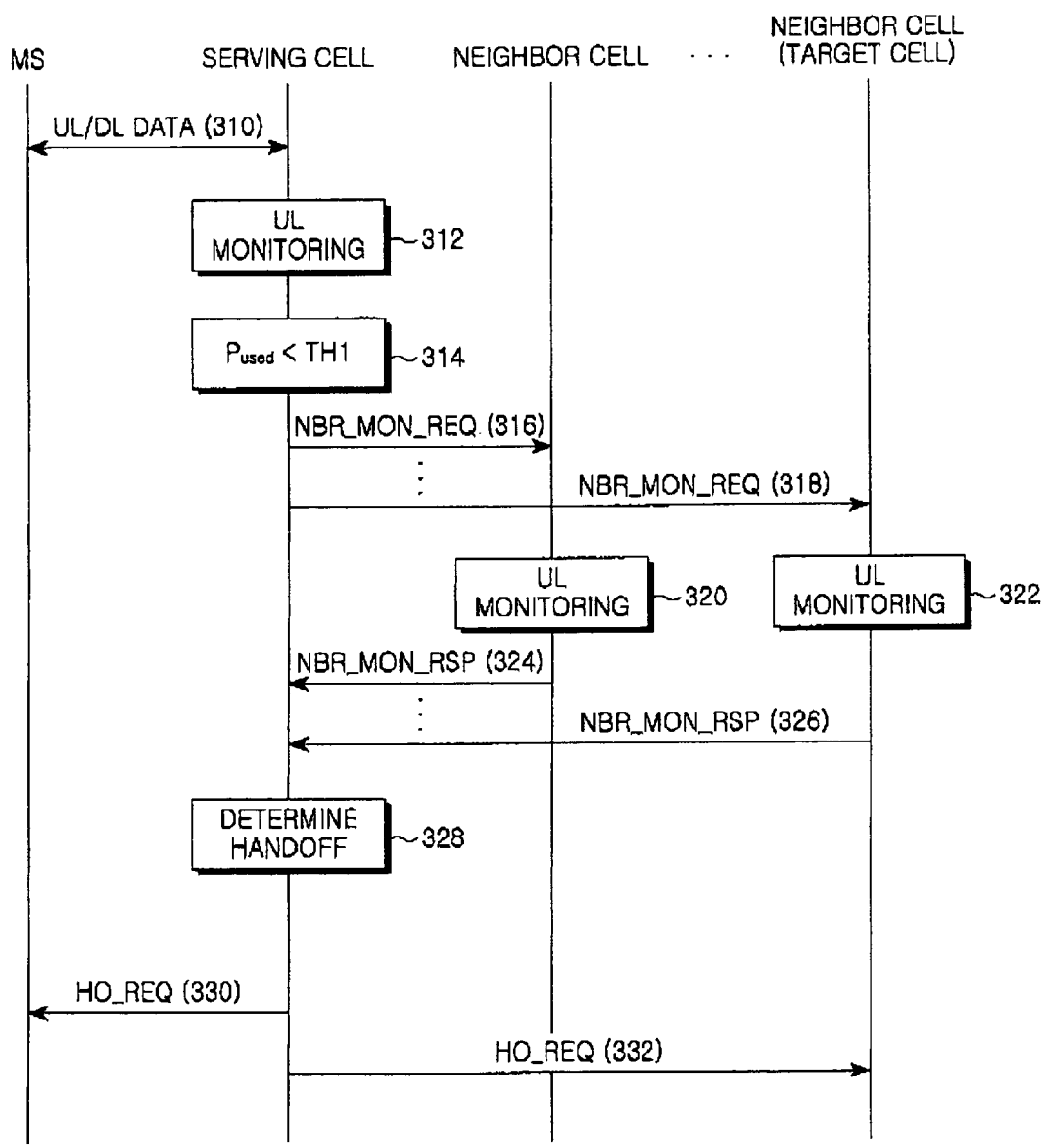
FIG. 3 illustrates the signaling performed for a handoff scheme in which only the uplink channel of a frequency band in use is considered according to the first embodiment of the present invention.

FIG. 3 illustrates the signaling performed for a handoff scheme in which only the uplink channel of a frequency band in use is considered according to the first embodiment of the present invention.

Referring to FIG. 3, in step 310, an MS transmits data (uplink data) to a serving BS through an uplink, and the serving BS transmits data (downlink data) to the MS through a downlink.

In step 312, the serving BS monitors the uplink to its all MSs to measure a level $P_{used}$ of an uplink signal for each individual MS. The uplink signal level can be found by measuring signal strength in the interval where uplink traffic is transmitted, compensating for a difference due to uplink power control or transmission power variation, and then accumulating the compensated signal strength for a selected time. Alternatively, the uplink signal level can be found by measuring strength of a pilot signal transmitted from the MS, compensating for a difference due to the uplink power control or transmission power variation, and then accumulating the compensated signal strength for a predetermined time.

In step 314, the serving BS determines whether the calculated level $P_{used}$ of the uplink signal is less than a threshold TH1. If the level $P_{used}$ of the uplink signal is greater than or equal to the threshold TH1, it indicates that the channel condition is good. In this case, the serving BS continues to perform steps 310 and 312. However, if the level $P_{used}$ of the uplink signal is less than the threshold TH1, the serving BS initializes the handoff process, determining that the channel condition is degraded. That is, the serving BS determines a target BS mapped to the corresponding MS in step 328, and sends a Handoff Request (HO_REQ) message to the corresponding MS and the target BS in steps 330 and 332, respectively.

In the foregoing description, it is assumed that the serving BS previously determines the target BS for the corresponding MS. Alternatively, however, it is possible to additionally assign the signaling for determining the target BS for the corresponding MS.

In this case, if the level $P_{used}$ of the uplink signal is less than the threshold TH1, the serving BS sends a Monitoring Request (NBR_MON_REQ) message for the uplink to neighbor BSs in steps 316 to 318. The neighbor BSs perform monitoring on the uplink of the corresponding MS in steps 320 and 322.

There are three possible proposed modes in which the neighbor BS measures an uplink signal of a corresponding MS through the monitoring.

A first mode is a passive mode in which the serving BS provides neighbor BSs with context information (uplink frequency in use, time assignment information, connection identifier (CID), etc.) associated with the corresponding MS so that the neighbor BSs may receive an uplink signal of the corresponding MS.

A second mode is an active mode in which the serving BS sends a request for channel sounding to the uplink to the corresponding MS, and the serving BS and the neighbor BS measure the uplink signal based on the sounding signal.

A third mode is an assisted mode in which for more accurate estimation of the uplink channel, the target BS does not use the resource currently used by the corresponding MS in its own cell using context information of the corresponding MS, provided from the serving BS.

Each of the neighbor BSs measures a level of the uplink signal from the corresponding MS using a selected one of the proposed modes. In addition, the neighbor BSs transmit the measured uplink signal level to the serving BS through a report message NBR_MON_RSP in steps 324 and 326.

The serving BS determines at least one target BS for each individual handoff MS considering the uplink signal level reported from the neighbor BS in step 328. A neighbor BS whose uplink signal level is greater by a threshold TH4 than an uplink signal level of the serving BS is designated as the target BS. A condition for designating the target BS can be defined by Equation (1) as $$P_{Neighbor} - P_{used} > TH4 \quad (1)$$

where $P_{Neighbor}$ denotes uplink signal levels reported from neighbor BSs.

If only one neighbor BS satisfies the above condition for a particular MS, the neighbor BS is designated as a target BS. However, if a plurality of neighbor BSs satisfy the condition, one or more neighbor BSs can be designated as the target BS according to the handoff scheme. That is, in the BBM handoff scheme, only the neighbor BS having the highest uplink signal level among the neighbor BSs is designated as a target BS. However, in the MBB scheme, all of the neighbor BSs are designated as target BSs.

After determining handoff and the target BS, the serving BS sends a Handoff Request (HO_REQ) message to the corresponding MS and the target BS in steps 330 and 332.

Figure 4:
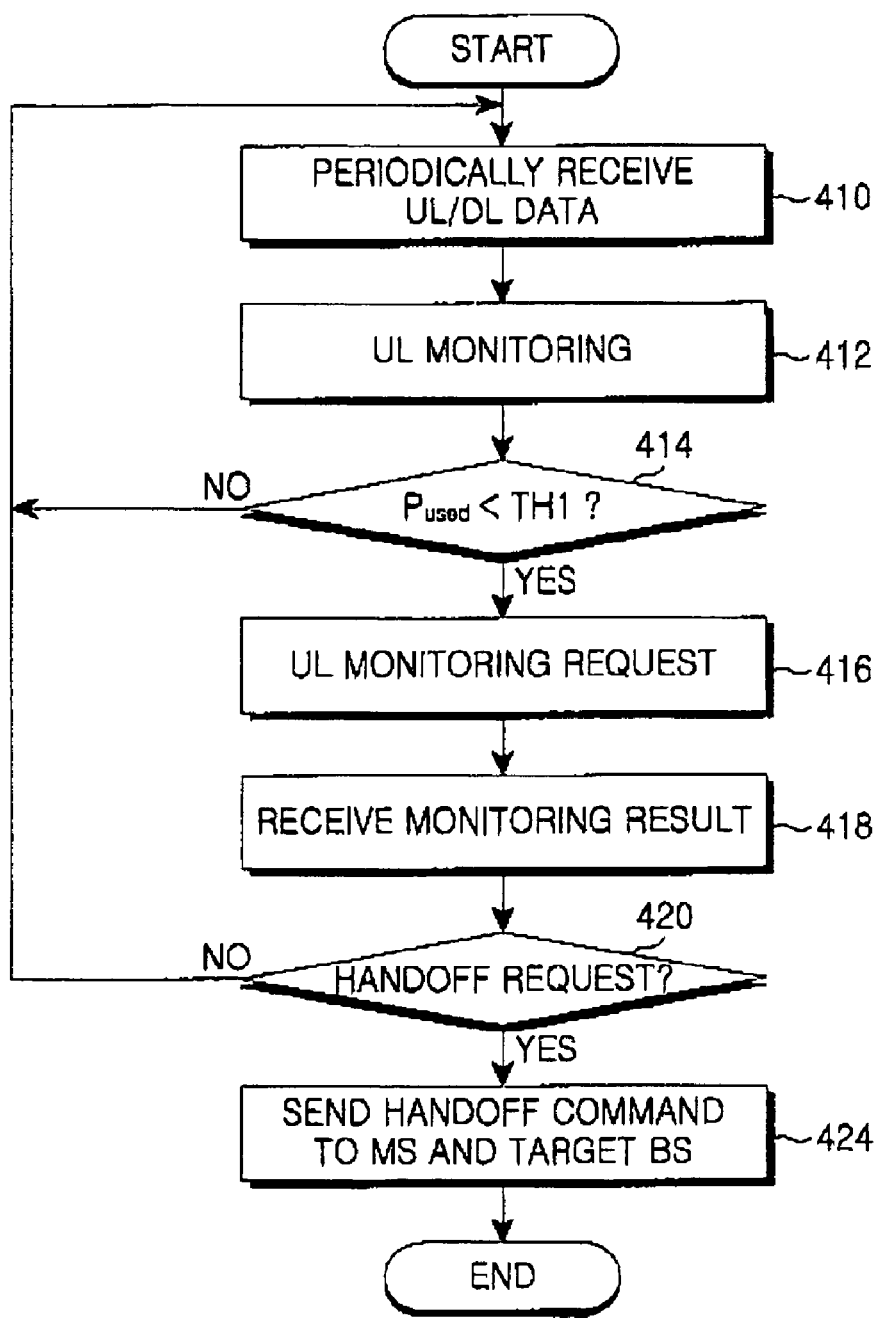
FIG. 4 illustrates a control flow of a serving BS for performing the signaling of FIG. 3.

FIG. 4 illustrates a control flow of a serving BS for performing the signaling of FIG. 3. The control flow shown in FIG. 4 can also be applied to the signaling with every MS belonging to the serving BS. However, it should be noted herein that the control flow is applied to the signaling with only one MS, for the sake of convenience.

Referring to FIG. 4, a serving BS measures strength of an uplink signal from uplink data received from an MS, and performs a handoff initialization process depending on an uplink signal level calculated based on the measured uplink signal strength. If necessary, the serving BS additionally considers the uplink signal levels of the neighbor BSs.

To this end, the serving BS receives uplink data and transmits downlink data in step 410. Thereafter, in step 412, the serving BS performs monitoring on the uplink using the received uplink data. The serving BS measures strength of the uplink signal through the monitoring, and calculates a level $P_{used}$ of the uplink signal using the measured uplink signal strength.

The uplink signal level $P_{used}$ can be calculated by measuring strength of an uplink signal in the interval where uplink traffic is transmitted, compensating for a difference due to the uplink power control or transmission power variation, and then accumulating the compensated signal strength for a selected time. Alternatively, the uplink signal level $P_{used}$ can also be calculated by measuring strength of a pilot signal transmitted from the MS, compensating for a difference due to the uplink power control or transmission power variation, and then accumulating the compensated signal strength for a selected time.

In step 414, the serving BS determines whether the measured uplink signal level $P_{used}$ is less than a threshold TH1. The threshold TH1 can be defined as a signal level at which there is a need for handoff, which is previously determined.

If the measured uplink signal level $P_{used}$ is greater than or equal to the threshold TH1, the serving BS determines that the current channel state is good enough so that there is no need for a handoff. Therefore, the serving BS returns to step 410 to receive the uplink data or transmit the downlink data.

However, if the measured uplink signal level $P_{used}$ is less than the threshold TH1, the serving BS performs an initialization process for a handoff. That is, in step 424, the serving BS sends a handoff command to the MS and the target BS. In order to determine handoff using only the uplink signal level in this manner, the serving BS should previously consider the channel conditions between the neighbor BSs and the MS.

Otherwise, if the serving BS does not consider the channel conditions between the neighbor BSs and the MS, there is a need to determine the channel conditions between the neighbor BSs and the MS. For this purpose, FIG. 4 additionally shows a process of determining the channel conditions between the neighbor BSs and the MS.

Upon determining the need for handoff depending on the uplink signal level $P_{used}$, the serving BS sends a request for monitoring the uplink to the MS to the neighbor BSs in step 416. In response thereto, the neighbor BSs monitor the uplink to the MS, and report the monitoring results to the serving BS.

In step 418, the serving BS receives the monitoring results from the neighbor BSs. The serving BS uses uplink signal levels of the serving BS and the neighbor BSs in order to determine the occurrence of a handoff and an appropriate target BS.

The serving BS determines in step 420 whether any neighbor BS has an uplink signal level greater by a threshold TH4 than its own uplink signal level $P_{used}$ among the reported uplink signal levels of the neighbor BSs. If no neighbor BS satisfies this condition, the serving BS returns to step 410 because there is no target BS to which the MS will perform handoff.

Otherwise, if at least one neighbor BS satisfies the condition, the serving BS designates the neighbor BS as a target BS for the MS. In the BBM handoff scheme, one neighbor BS can be designated as the target BS, and in the MBB handoff scheme, multiple neighbor BSs can be designated as target BSs.

After designating the target BS for the MS, the serving BS sends a Handoff Request (HO_REQ) message to the MS and at least one target BS in step 424. Upon receipt of the HO_ReQ message, the MS performs a handoff to the target BS. Upon receipt of the HO_REQ message, the target BS starts a service to the MS through a handoff procedure.

A-2. Handoff Performed Considering Uplink Channel of Full Frequency Band

If a particular MS belonging to a serving BS uses only a partial frequency band, and not the full frequency band in a multi-carrier system, the serving BS can determine where to perform handoff considering an uplink signal level of the currently unused frequency band so as not to mistake degradation in the radio environment of the partial frequency band for occurrence of the handoff. That is, if the current uplink signal level $P_{used}$ is less than a threshold TH1, the serving BS determines whether to perform handoff considering the uplink signal level of the currently unused frequency band.

Figure 5:
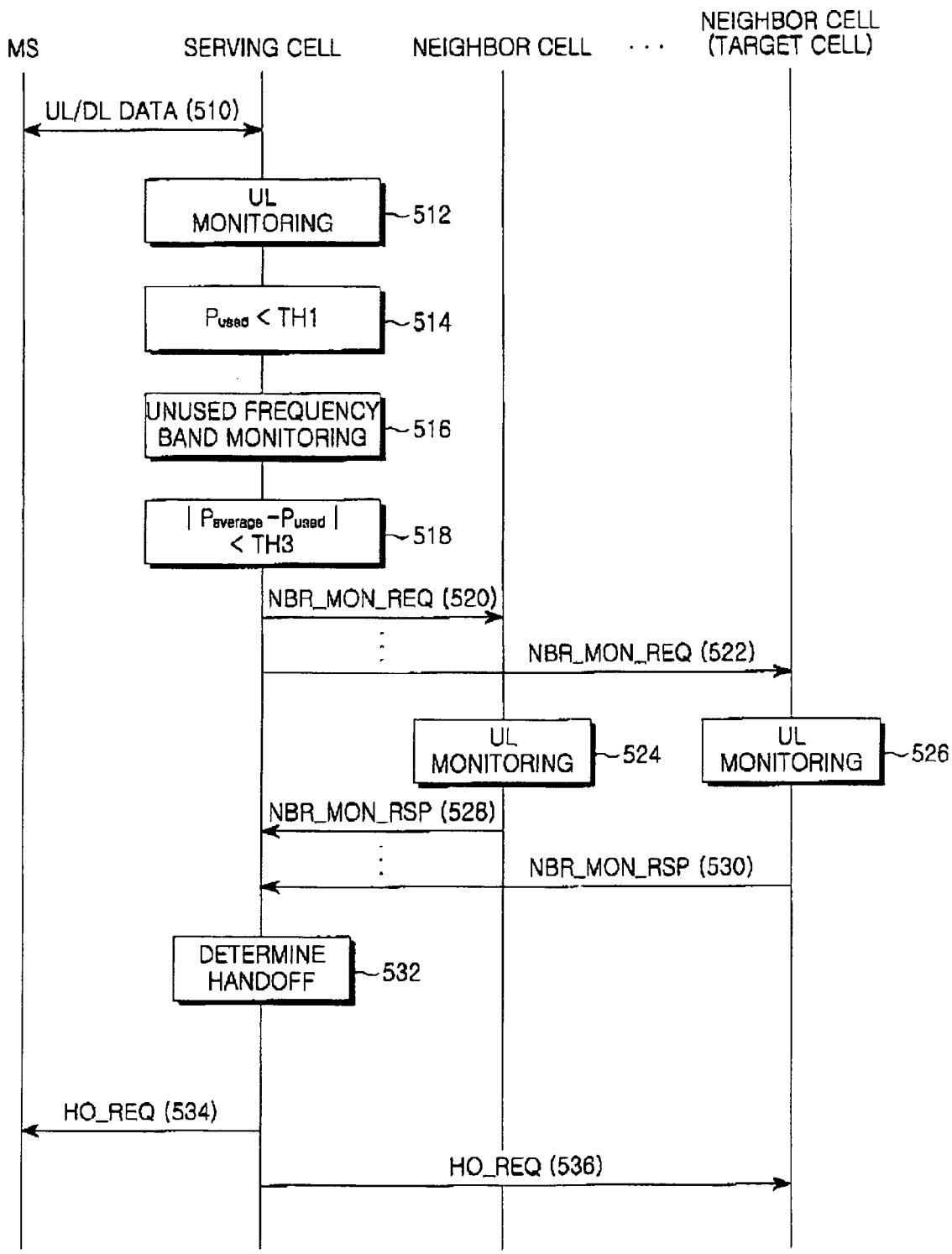
FIG. 5 illustrates the signaling performed for a handoff scheme in which the uplink channel environment of the full frequency band is considered according to the first embodiment of the present invention.

FIG. 5 illustrates the signaling performed for a handoff scheme in which the uplink channel environment of the full frequency band is considered according to the first embodiment of the present invention. Compared with the signaling of FIG. 3, the signaling of FIG. 5 further includes steps 516 and 518 of monitoring an unused frequency band, and determining whether to perform handoff depending on the monitoring result. Therefore, a detailed description of the same steps as those of FIG. 3 will be omitted.

Referring to FIG. 5, in step 510, uplink/downlink data is transmitted. In step 512, the serving BS monitors the uplink for each individual MS to measure an uplink signal level $P_{used}$. In step 514, the serving BS determines whether there is any MS having an uplink signal level $P_{used}$ that is less than a threshold TH1.

In step 516, the serving BS monitors the unused frequency band that is currently unused by the determined MSs. For this purpose, the serving BS sends a request for signal transmission through the unused frequency band to the determined MSs. Upon receipt of the request, the MSs transmit uplink signals in the unused frequency band. In response to the request, the serving BS measures levels $P_{unused}$ of the uplink signals received from the MSs. The uplink signal level $P_{unused}$ of the unused frequency band can be measured in the method used for calculating the $P_{used}$.

After completion of the monitoring on the unused frequency band, the serving BS determines in step 518 whether to perform a handoff initialization operation on each of the MSs. For example, if a difference between the current uplink signal level $P_{used}$ and an average $P_{average}$ of the uplink signal levels in the unused frequency band is less than a threshold TH3, the serving BS initializes the handoff process. This is an optional process provided to prevent a possible mistaken determination of a need for the handoff process, even though the MS using a partial frequency band should be allocated another frequency band because the frequency band currently used for the uplink suffers from a frequency selective fading effect.

The serving BS sends a Monitoring Request (NBR_MON_REQ) message for the uplink to the neighbor BSs for handoff initialization in steps 520 and 522. The neighbor BSs perform monitoring on the uplink from the corresponding MS in steps 524 and 526. The neighbor BSs transmit the uplink signal levels measured through the monitoring to the serving BS through a report message NBR_MON_RSP in steps 528 and 530.

In step 532, the serving BS determines at least one target BS for each individual handoff MS considering the uplink signal level reported from the neighbor BS. After determining the handoff and the target BS, the serving BS sends a HO_REQ message to the corresponding MS and the target BS in steps 534 and 536.

Figure 6:
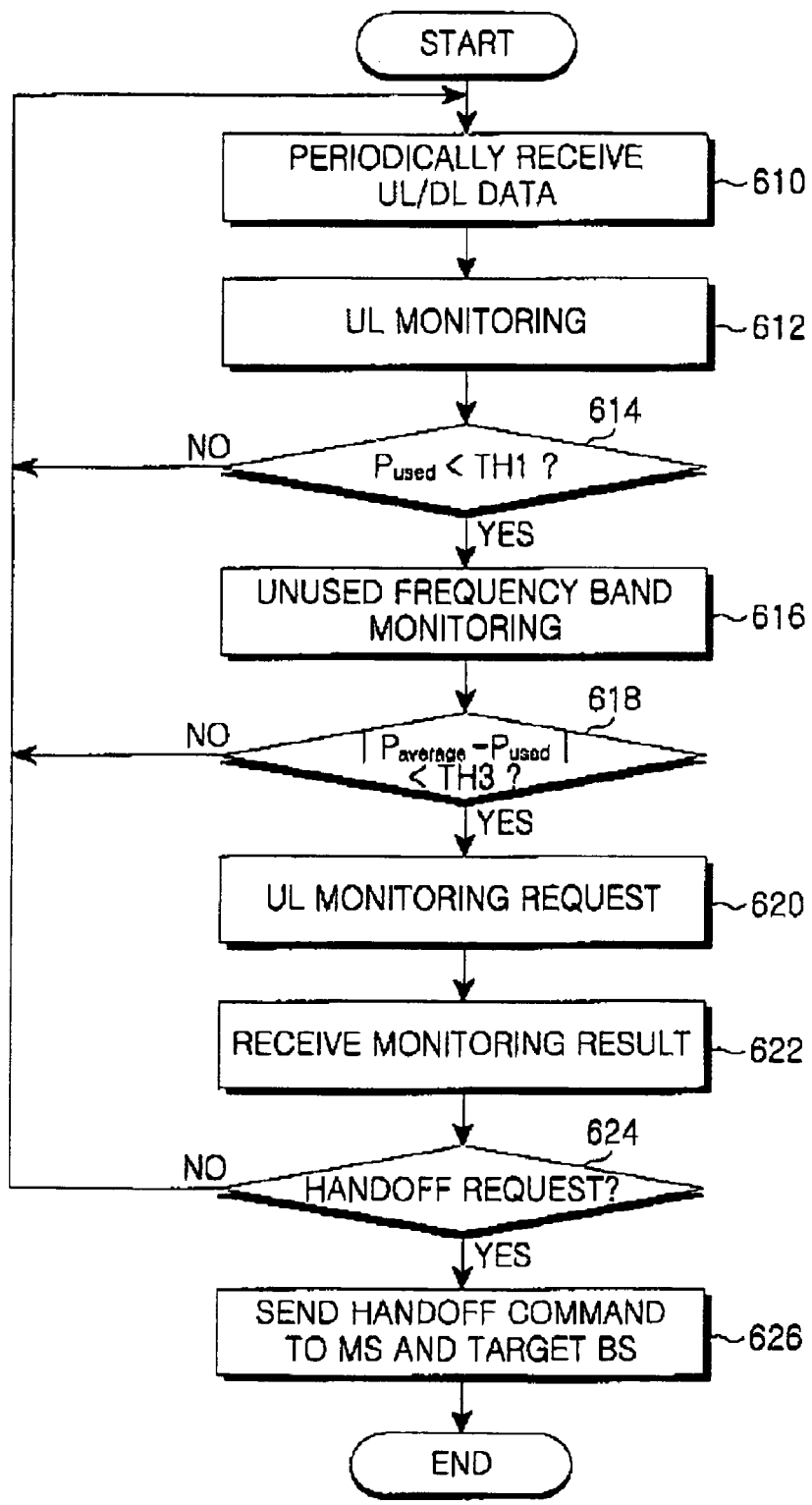
FIG. 6 illustrates a control flow of a serving BS for performing the signaling of FIG. 5.

FIG. 6 illustrates a control flow of a serving BS for performing the signaling of FIG. 5. The control flow shown in FIG. 6 can also be applied to the signaling with every MS belonging to the serving BS. However, it should be noted herein that the control flow is applied to the signaling with only one MS, for the sake of convenience.

Referring to FIG. 6, in step 610, the serving BS receives uplink data and transmits downlink data. In step 612, the serving BS performs monitoring on the uplink depending on the uplink data. The serving BS measures strength of the uplink signal through the monitoring, and calculates a level $P_{used}$ of the uplink signal using the measured uplink signal strength.

In step 614, the serving BS determines whether the measured uplink signal level $P_{used}$ is less than a threshold TH1. If the measured uplink signal level $P_{used}$ is greater than or equal to the threshold TH1, the serving BS proceeds to step 610. However, if the measured uplink signal level $P_{used}$ is less than the threshold TH1, the serving BS performs monitoring on the unused frequency band in step 616.

To monitor on the unused frequency band, the serving BS sends a request for transmission of uplink signals through the unused frequency band to the corresponding MS. The serving BS calculates a level $P_{unused}$ of the uplink signal received from the MS in response to the request. Thereafter, the serving BS determines in step 618 whether to perform handoff initialization depending on the condition shown in Equation (2) below.

$$|P_{average} - P_{used}| < TH3 \tag{2}$$

where $P_{average}$ denotes an average of uplink signal levels $P_{unused}$ in the unused frequency band.

If this condition is satisfied, the serving BS sends a request for monitoring the uplink to the MS to neighbor BSs in step 620. In step 622, the serving BS receives the monitoring results from the neighbor BSs in response to the request.

The serving BS determine in step 624 whether there is any neighbor BS having an uplink signal level higher by a threshold TH4 than its own uplink signal level $P_{used}$ among the uplink signal levels of the neighbor BSs, received as the monitoring results.

The serving BS designates the neighbor BS satisfying the above condition as a target BS for the MS. In step 626, the serving BS sends a HO_REQ message to the MS and at least one target BS.

A-3. Handoff Performed Considering Uplink/Downlink Channels of Full Frequency Band In summary of the following description, a serving BS can consider both the uplink signal levels of the serving BS and the neighbor BS and the downlink signal level of the serving BS in order to determine handoff and an appropriate target BS. That is, the serving BS determines whether to perform handoff using the greater value between the uplink signal level and an average of the downlink signal levels.

Both the uplink and the downlink are considered in order to prevent degradation in the radio environment of a particular frequency band from being mistaken for occurrence of the handoff, using the symmetry between uplink and downlink wireless channels in a TDD system.

Figure 7:
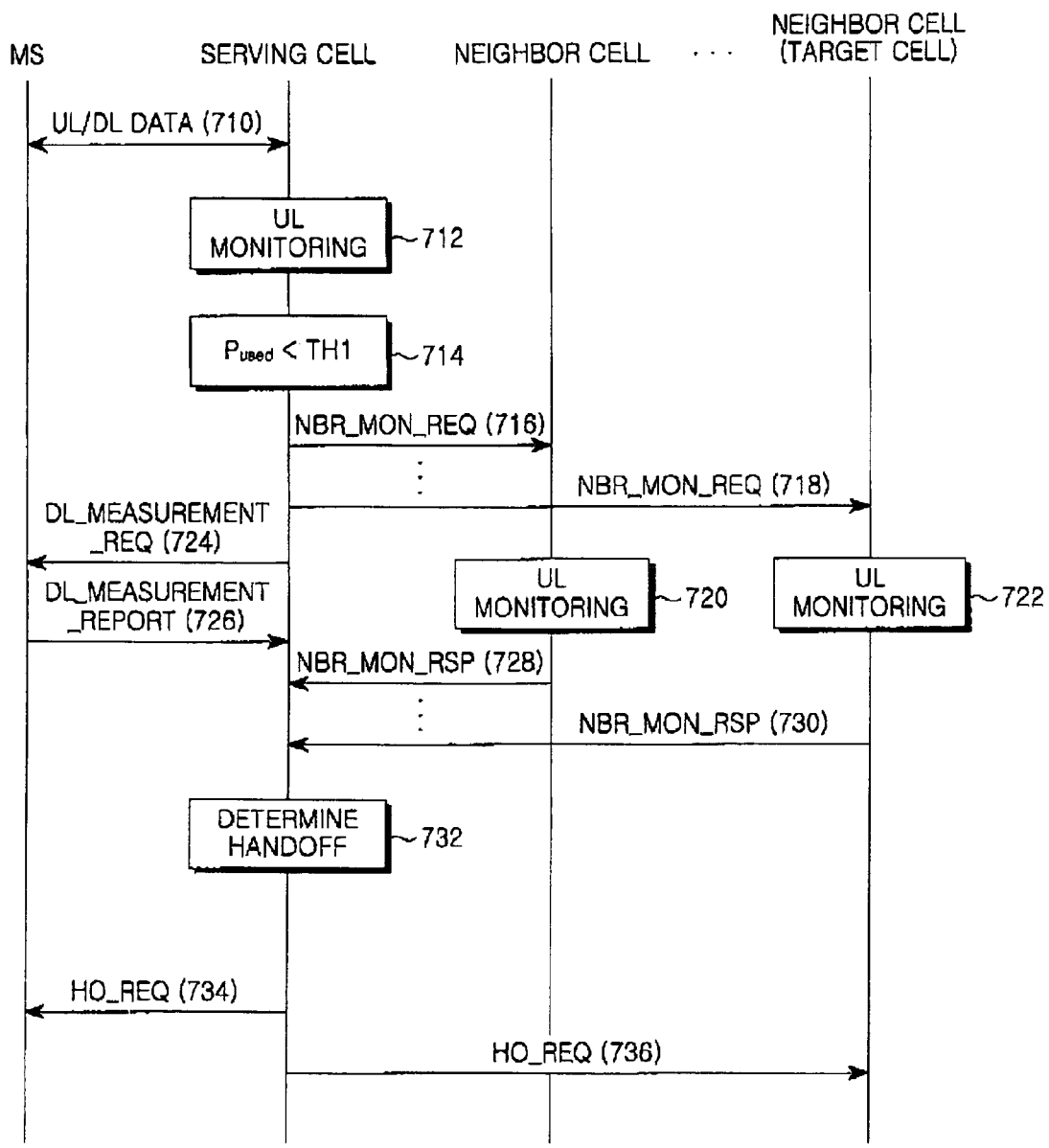
FIG. 7 illustrates the signaling performed for a handoff scheme in which both uplink/downlink channels are taken into consideration according to the first embodiment of the present invention.

FIG. 7 illustrates the signaling performed for a handoff scheme in which both uplink/downlink channels are taken into consideration according to the first embodiment of the present invention. Compared with the signaling of FIG. 3, the signaling of FIG. 7 further includes steps 724 and 726 of acquiring information on the downlink channel. Therefore, a detailed description of the same steps as those of FIG. 3 will be omitted.

Referring to FIG. 7, in step 710, uplink/downlink data is transmitted. In step 712, the serving BS monitors the uplink for each individual MS to measure a level $P_{UL\_used}$ of an uplink signal. In step 714, the serving BS determines whether there is any MS having an uplink signal level $P_{UL\_used}$ that is less than a threshold TH1.

The serving BS sends a Monitoring Request (NBR_MON_REQ) message for the uplink to the neighbor BSs for handoff initialization in steps 716 and 718. The neighbor BSs perform monitoring on the uplink from the corresponding MS in steps 720 and 722. The neighbor BSs transmit the uplink signal levels measured through the monitoring to the serving BS through a report message NBR_MON_RSP in steps 728 and 730.

The serving BS sends a channel state search request for a downlink channel with the serving BS to the corresponding MS in addition to sending the request for measurement of the uplink signal level of the corresponding MS to the neighbor BS. In order to maintain synchronization with the serving BS, the MS should periodically receive a preamble or a pilot signal from the serving BS, and report the received values to the serving BS in response to the downlink channel state search request of the serving BS. This can be distinguished from the existing process in which the MS monitors the downlink of the neighbor BS, in that the new process has no need to set up an additional search interval.

If the MS has a result obtained by measuring a signal level of the downlink to the neighbor BS in an idle mode before receipt of the request from the serving BS, and the result is valid, then this can be additionally used for designation of a correct target BS.

The MS transmits the downlink monitoring result to the serving BS through a report message DL_MEASUREMENT_REPORT.

In step 732, the serving BS determines the occurrence of a handoff and an appropriate target BS. For this purpose, the serving BS uses an uplink signal level $P_{UL\_used}$ of the serving BS, an uplink signal level $P_{UL\_neighbor}$ of the neighbor BS, and a downlink signal level $P_{DL}$ of the serving BS. A condition for determining occurrence of the handoff can be defined as Equation (3) below, and a condition for determining a proper target BS can be defined as Equation (4) below.

$$|P_{DL} - P_{UL\_used}| < TH3 \tag{3}$$

$$P_{UL\_neighbor} - P_{UL\_used} < TH4 \tag{4}$$

If the condition of Equation (3) is satisfied, the serving BS determines that there is a need for a handoff for the corresponding MS, and designates a neighbor BS satisfying the condition of Equation (4) as a target BS for the MS.

After determining the handoff and the target BS, the serving BS sends a HO_REQ message to the corresponding MS and at least one target BS in steps 734 and 736.

Figure 8:
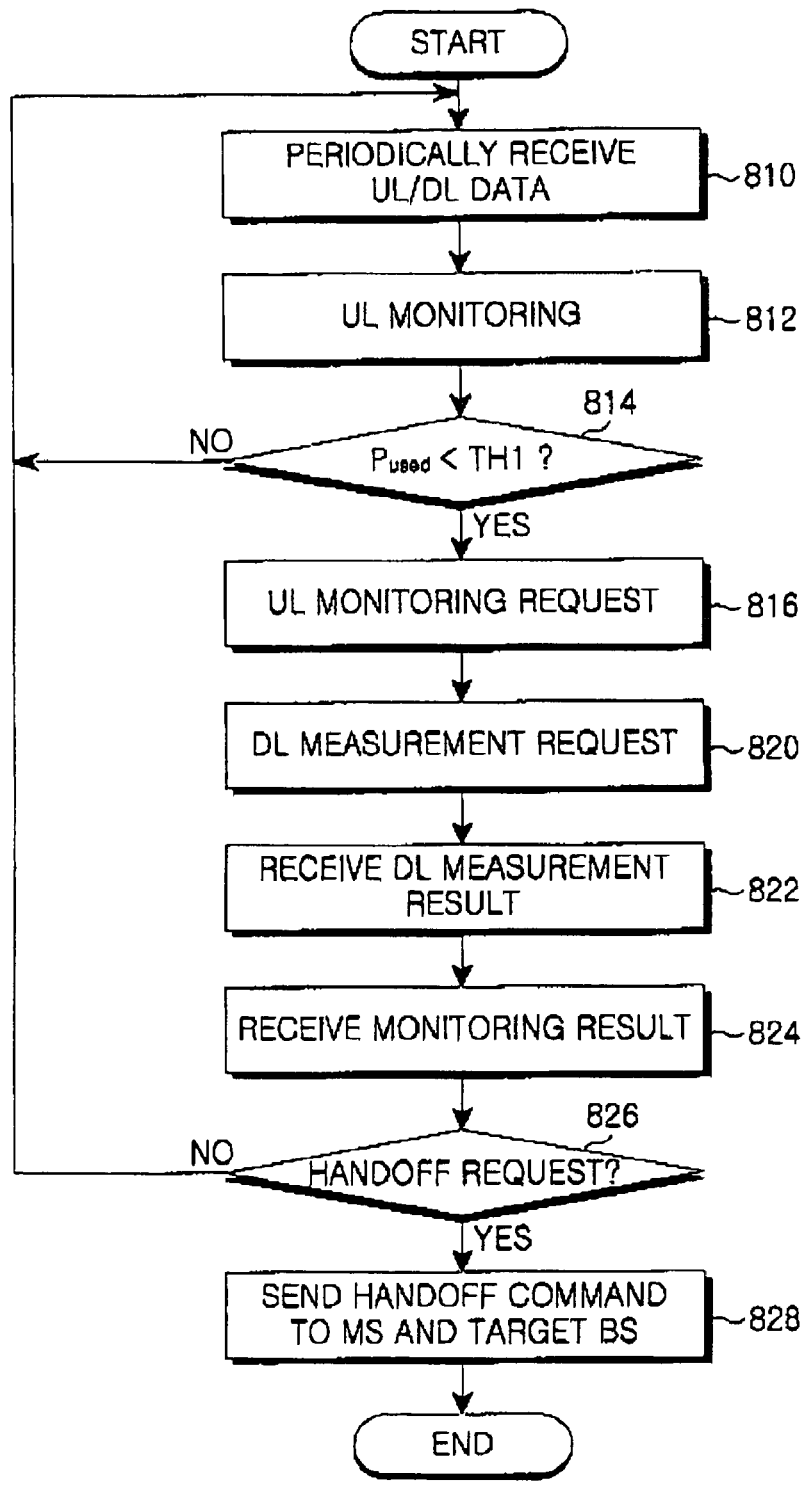
FIG. 8 illustrates a control flow of a serving BS for performing the signaling of FIG. 7.

FIG. 8 illustrates a control flow of a serving BS for performing the signaling of FIG. 7. The control flow shown in FIG. 8 can also be applied to the signaling with every MS belonging to the serving BS. However, it should be noted herein that the control flow is applied to the signaling with only one MS, for the sake of convenience.

Referring to FIG. 8, in step 810, the serving BS receives uplink data and transmits downlink data. In step 812, the serving BS performs monitoring on the uplink depending on the uplink data. The serving BS measures strength of the uplink signal through the monitoring, and calculates a level $P_{UL\_used}$ of the uplink signal using the measured uplink signal strength.

In step 814, the serving BS determines whether the measured uplink signal level $P_{UL\_used}$ is less than a threshold TH1. If the measured uplink signal level $P_{UL\_used}$ is higher than or equal to the threshold TH1, the serving BS proceeds to step 810. However, if the measured uplink signal level $P_{UL\_used}$ is less than the threshold TH1, the serving BS sends a monitoring request for the uplink to the corresponding MS to the neighbor BSs in step 816. The request is achieved by transmission of a NBR_MON_REQ message. In step 820, the serving BS sends a measurement request for the downlink channel state to the MS.

The neighbor BSs monitor the uplink to the MS, and report the monitoring results to the serving BS. The MS monitors the downlink to the serving BS, and reports the monitoring result to the serving BS.

The serving BS receives the monitoring results from the neighbor BSs in step 822, and receives the monitoring result from the MS in step 824. The monitoring results reported from the neighbor BSs can include information on the uplink signal level for the MS. The monitoring result reported from the MS can include information on the downlink signal level between the MS and the serving BS.

In step 826, the serving BS determines the occurrence of the handoff and at least one target BS considering the monitoring results from the neighbor BSs and the MS, and its measured uplink signal level. That is, the serving BS determines whether to perform handoff initialization. The occurrence of the handoff can be determined by Equation (3), and the target BS can be determined by Equation (4).

After determining a need for the handoff initialization, the serving BS sends a HO_REQ message to the MS and at least one target BS in step 828.

B. Second Embodiment

The second embodiment is distinguishable from the first embodiment in that a neighbor BS is the subject of initializing the handoff. That is, in the second embodiment, the subject of collecting uplink/downlink signal levels of an MS and a serving/neighbor BS and determining handoff depending on the signal levels is the neighbor BS.

For this purpose, the neighbor BS periodically monitors the channel environments of uplinks transmitted by MSs belonging to its neighbor cell, and initializes a handoff procedure of the corresponding MS using the monitoring result. In order to prevent an incorrect handoff operation, the neighbor BS can additionally consider the downlink channel state between the serving BS and the MS, and an uplink signal level of the unused frequency band.

Figure 9:
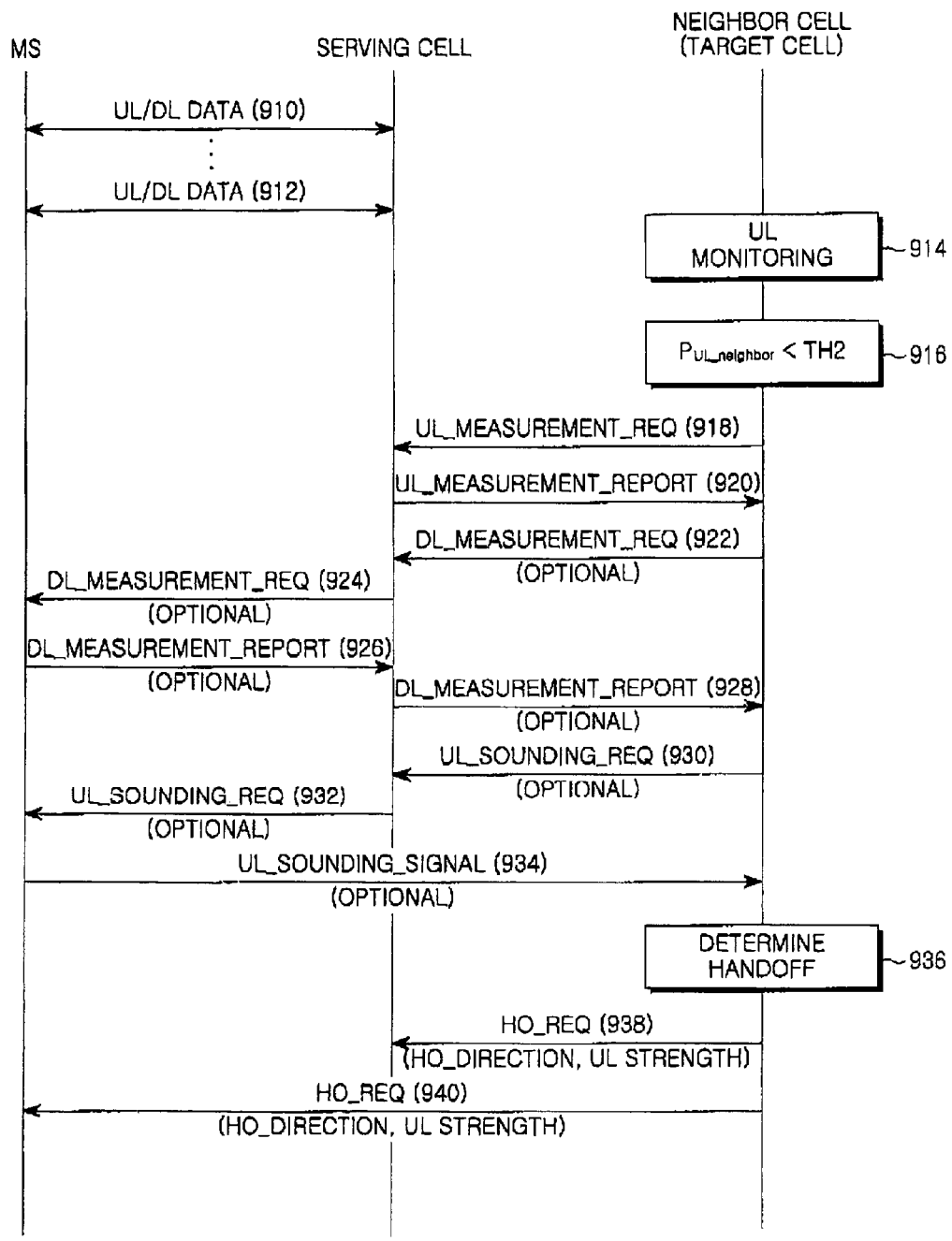
FIG. 9 illustrates the signaling performed for a handoff scheme proposed in a second embodiment of the present invention.

FIG. 9 illustrates the signaling performed for a handoff scheme proposed in the second embodiment of the present invention.

Referring to FIG. 9, uplink/downlink data is exchanged between a serving BS and an MS in steps 910 and 912. In step 914, each neighbor BS monitors an uplink to the MS periodically or aperiodically. The monitoring is performed on the traffic channel or uplink pilot signal to the MS. The neighbor BSs measure uplink signal levels $P_{UL\_neighbor}$ through the monitoring. If necessary, the serving BS provides MS-related context information so that the neighbor BS may measure a signal level of the uplink to the MS. In this case, the serving BS provides Quality of Service (QoS) information of the MS.

In step 916, the neighbor BS determines whether the measured uplink signal level $P_{UL\_neighbor}$ is greater than a threshold TH2, meaning that the uplink signal received from the MS has a level high enough to perform a handoff.

In step 918, upon receipt of the uplink signal having a level high enough to perform handoff, the neighbor BS sends an uplink monitoring request (UL_MEASUREMENT_REQ) message to the serving BS.

Upon receipt of the UL_MEASUREMENT_REQ message, the serving BS performs monitoring on the uplink to the MS, and transmits its uplink signal level $P_{UL\_serving}$ measured through the monitoring to the neighbor BSs using a measurement report (UL_MEASUREMENT_REPORT) message.

Each of the neighbor BSs gathers its measured uplink signal level $P_{UL\_neighbor}$ and the uplink signal level $P_{UL\_serving}$ provided from the serving BS, and determines whether to perform a handoff using the signal levels in step 936. After determining to perform a handoff in this manner, the neighbor BS sends a HO_REQ message to the MS and the serving BS in steps 938 and 940.

If there is a need to consider the downlink signal level, the neighbor BS can send a monitoring request for the downlink to the serving BS in step 922. For this, the neighbor BS sends a Downlink Measurement Request (DL_MEASUREMENT_REQ) message to the serving BS In step 924, upon receipt of the DL_MEASUREMENT_REQ message from the neighbor BS, the serving BS forwards the received message to the MS. In step 926, upon receipt of the DL_MEASUREMENT_REQ message from the serving BS, the MS monitors the downlink formed to the serving BS, and transmits the downlink signal level measured through the monitoring to the serving BS using a report message DL_MEASUREMENT_REPORT. In step 928, upon receipt of the DL_MEASUREMENT_REPORT message from the MS, the serving BS forwards the received message to the neighbor BS. As a result, the neighbor BS can consider the downlink signal level in determining handoff initialization.

In step 930, the neighbor BS, if it desires to monitor the uplink channel state of a particular frequency band, can send a request for the uplink channel state monitoring to the MS by transmitting a signal of the particular frequency band. In this case, a UL_SOUNDING_REQ message is transmitted from the neighbor BS to the serving BS. In step 932, upon receipt of the UL_SOUNDING_REQ message, the serving BS forwards the received message to the MS. In step 934, upon receipt of the UL_SOUNDING_REQ message, the MS transmits an uplink signal to the neighbor BS in the particular frequency band.

In this manner, the neighbor BS can measure a level of the downlink signal received in the particular frequency band. In determining the handoff initialization, the neighbor BS additionally considers the uplink signal level measured in the particular frequency band.

Figure 10:
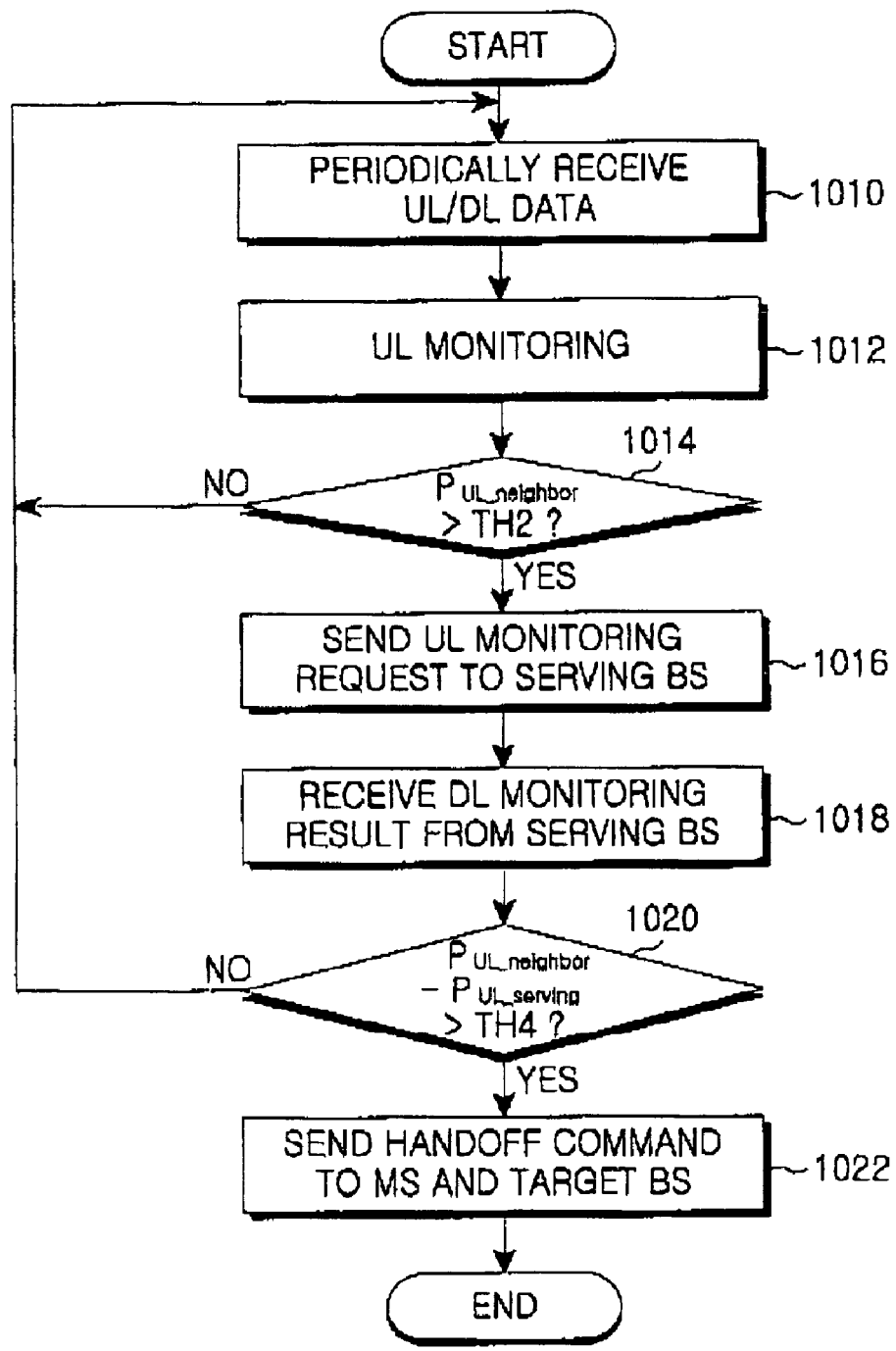
FIG. 10 illustrates a control flow of a serving BS for performing the signaling of FIG. 9.

FIG. 10 illustrates a control flow of a serving BS for performing the signaling of FIG. 9. The control flow shown in FIG. 10 can also be applied to the signaling with every MS belonging to the serving BS. However, it should be noted herein that the control flow is applied to the signaling with only one MS, for the sake of convenience. Although the options shown in FIG. 9 are not taken into consideration in FIG. 10, those skilled in the art would recognize that the options can be reflected.

Referring to FIG. 10, in step 1010, a neighbor BS receives uplink data and transmits downlink data. In step 1012, the neighbor BS performs monitoring on the uplink depending on the uplink data. The neighbor BS measures strength of an uplink signal through the monitoring, and calculates a level $P_{UL\_neighbor}$ of the uplink signal using the measured uplink signal strength.

In step 1014, the neighbor BS determines whether the measured uplink signal level $P_{UL\_neighbor}$ is greater than a threshold TH2. The threshold TH2 can be defined as a signal level at which there is a need for handoff, which is previously determined.

If the measured uplink signal level $P_{UL\_neighbor}$ is less than or equal to the threshold TH2, the neighbor BS determines that the current channel state is not good enough, causing a need for a handoff. Therefore, the neighbor BS returns to step 1010 to receive the uplink data or transmit the downlink data.

However, if the measured uplink signal level $P_{UL\_neighbor}$ is greater than the threshold TH2, the neighbor BS sends a monitoring request for the uplink to the MS to the serving BS in step 1016. In response thereto, the serving BS monitors the uplink to the MS, and reports the monitoring result to the neighbor BS.

In step 1018, the neighbor BS receives the monitoring result from the serving BS. The monitoring result includes an uplink signal level $PUL\_seving$ from the serving BS. The neighbor BS uses its measured uplink signal level $P_{UL\_neighbor}$ and the measured uplink signal level PUL_seving from the serving BS to determine an occurrence of the handoff and designate itself, the neighbor BS, as a target BS.

In step 1020, the neighbor BS determines whether its measured uplink signal level $P_{UL\_neighbor}$ is greater by a threshold TH4 than the uplink signal level PUL_seving measured by the serving BS. This can be expressed as Equation (5), in which $$P_{UL\_neighbor} - P_{UL\_seving} > TH4 \quad (5)$$

If the condition of Equation (5) is satisfied, the neighbor BS designates itself as a target BS for the MS. In step 1022, the neighbor BS sends a HO_REQ message to the MS and the serving BS.

The target BS transmits the HO_REQ message to the MS together with its measured uplink signal level $P_{UL\_neighbor}$. This transmittal anticipates multiple target BSs simultaneously sending a HO_REQ message to one MS because of the possibility that there is a plurality of neighbor BSs in a handoff region in the overlapped-cell configuration. The MBB handoff scheme can perform handoff for every target BS that requests the handoff. However, the BBM handoff scheme enables the MS to compare uplink signal levels reported from the target BSs and select one target BS depending on the comparison result.

As described above, an embodiment of the present invention proposes a handoff initialization method capable of preventing an increase in data transmission delay and complexity occurring in a handoff process and also preventing a waste of uplink resources by initializing the handoff process based on the uplink signal level, without using in the handoff initialization process the downlink pilot signal strength received from the neighbor BSs that requires periodic search interval setup, calculation in the MS and report through the uplink.

In addition, an embodiment of the present invention proposes a handoff method for performing handoff not only when the radio environment between the serving BS and the MS is poor, but also when there is a better radio environment, by using the uplink signal level between the MS and the neighbor BSs in a process of determining handoff. Compared with the handoff method based only on the uplink signal level of the serving BS, the new handoff method contributes to an increase in average data throughput in the cell.

In the present invention, if the uplink signal level between the MS and the serving BS is low, the MS measures a downlink signal level and reports the measurement result to the serving BS. Therefore, the serving BS can determine whether to perform handoff by additionally considering the reported measurement value. As a result, compared with the method of periodically detecting a downlink signal level for the neighbor BS, the new method can not only prevent a transmission delay due to setup of the search interval, but also correctly determine the occurrence of the handoff.

In addition, by applying the proposed handoff method based on the uplink signal level to the inter-sector handoff, it is also possible to support an inter-sector handoff method that is based on the uplink signal level between the MS and the serving sector and the uplink signal level between the MS and the neighbor sector, and optionally based on the downlink signal level between the MS and the serving sector.

As can be understood from the foregoing description, the present invention can not only prevent a delay in data transmission time due to the handoff, but also prevent additional calculation of the MS. In addition, the present invention prevents a resource waste caused by periodically transmitting the downlink signal level between the neighbor BSs and the MS to the BS through the uplink, and also prevents an incorrect handoff operation due to the handoff.

In addition, the handoff scheme proposed in the present invention can also prevent the performance degradation occurring as the serving BS mistakes it for occurrence of a handoff even though the wireless channel environment between the serving BS and the MS is degraded due to the frequency selective channel environment in the OFDMA system using multi-user diversity. Therefore, the proposed handoff scheme can be used as a method for guaranteeing mobility for the BWA cellular system using the multi-user diversity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile communication system, comprising:
    a mobile station (MS);
    a serving base station (BS) for measuring a strength of a first uplink signal received from the MS, transmitting a request for transmission of a signal through a frequency band unused in an uplink to the MS, and measuring a strength of a second uplink signal received in response to the request, receiving information about a strength of a third uplink signal measured by at least one neighbor BS, and determining a handoff for the MS considering the strength of the first uplink signal, the strength of the second uplink signal and the strength of the third uplink signal; and
    the at least one neighbor BS for measuring the strength of the third uplink signal received from the MS at a request of the serving BS, and transmitting information about the measured strength of the third uplink signal to the serving BS.

2. The mobile communication system of claim 1, wherein the serving BS calculates the strength of the first uplink signal using a strength of a data signal transmitted from the MS.

3. The mobile communication system of claim 1, wherein the serving BS calculates the strength of the first uplink signal using a strength of a pilot signal transmitted from the MS.

4. The mobile communication system of claim 1, wherein the serving BS determines handoff for the MS when the strength of the first uplink signal is less than a first threshold, a difference between the strength of the first uplink signal and the strength of the second uplink signal is lower than a second threshold, and the strength of the third uplink signal is higher than or equal to a third threshold.

5. The mobile communication system of claim 4, wherein the serving BS determines a neighbor BS that reported the strength of the third uplink signal, which is greater by the third threshold than the strength of the first uplink signal, as a target BS to which the MS will perform the handoff.

6. The mobile communication system of claim 5, wherein the serving BS transmits a handoff command message to the MS and the target BS when handoff for the MS is determined.

7. The mobile communication system of claim 1, wherein the strength of the first uplink signal and the strength of the third uplink signal are respectively acquired by compensating for a difference due to uplink power control or transmission power variation for strength of a corresponding uplink signal, and then accumulating the compensated signal strength for a selected time.

8. The system of claim 1, wherein the strength of the first uplink signal and the strength of the third uplink signal are measured based on a channel sounding signal transmitted from the MS.

9. The mobile communication system of claim 1, wherein the serving BS transmits context information of the MS to the at least one neighbor BS so that the at least one neighbor BS can measure the strength of the third uplink signal.

10. The system of claim 9, wherein the context information of the MS includes an uplink frequency in use, time alignment information and a connection identifier (CID).

11. The system of claim 9, wherein the at least one neighbor BS does not use a resource used by the MS in a cell of the at least one neighbor BS using the context information.

* * * * *